Sept. 15, 1925.
W. S. HARLEY
1,553,610
LAMP BRACKET
Filed April 13, 1922     3 Sheets-Sheet 1
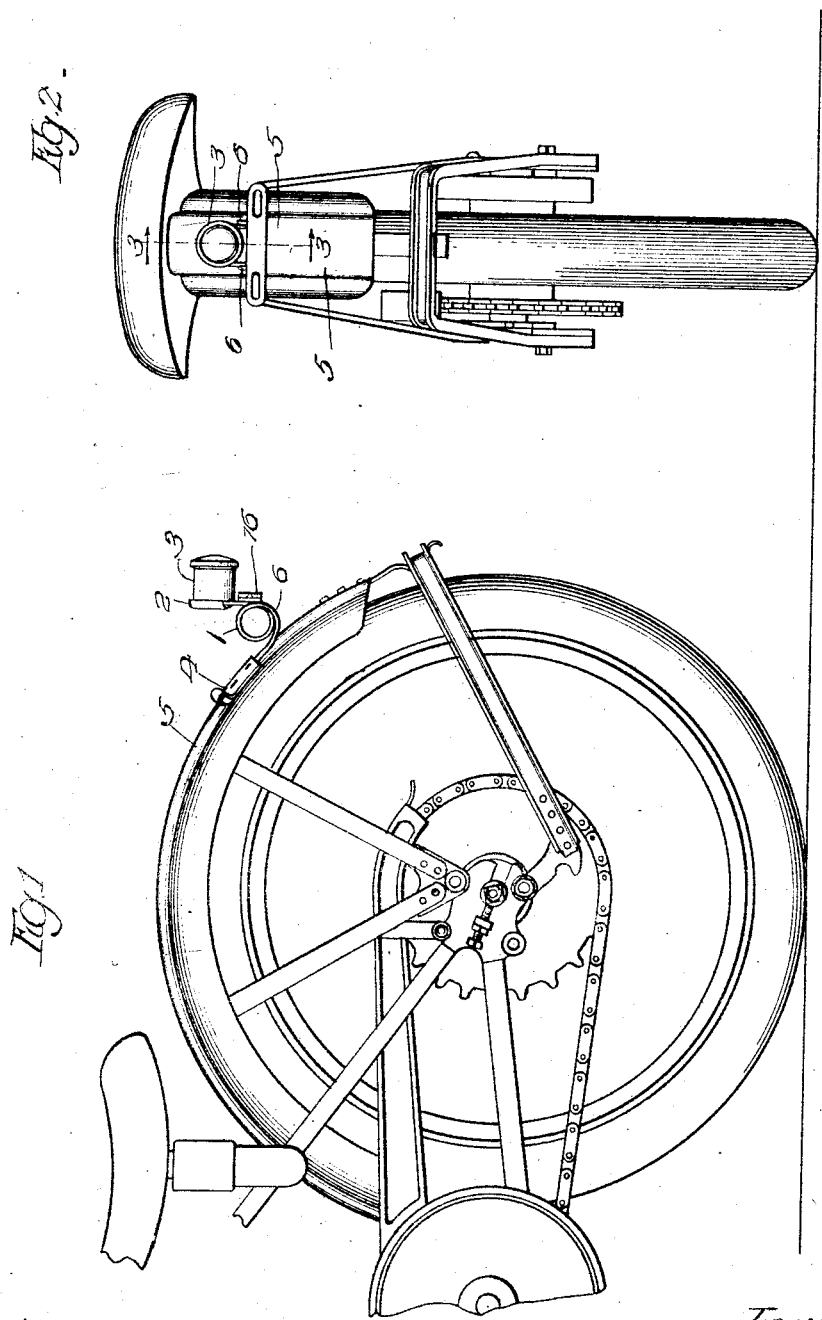
Inventor
William S. Harley.
By Edwin B H Tower Sept. 15, 1925.  W. S. HARLEY  1,553,610
LAMP BRACKET
Filed April 13, 1922   3 Sheets-Sheet 2
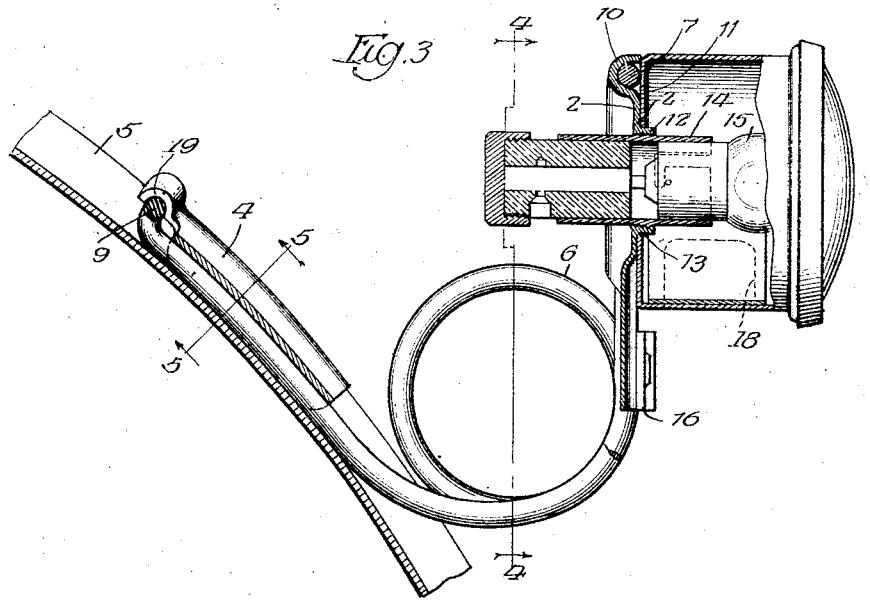
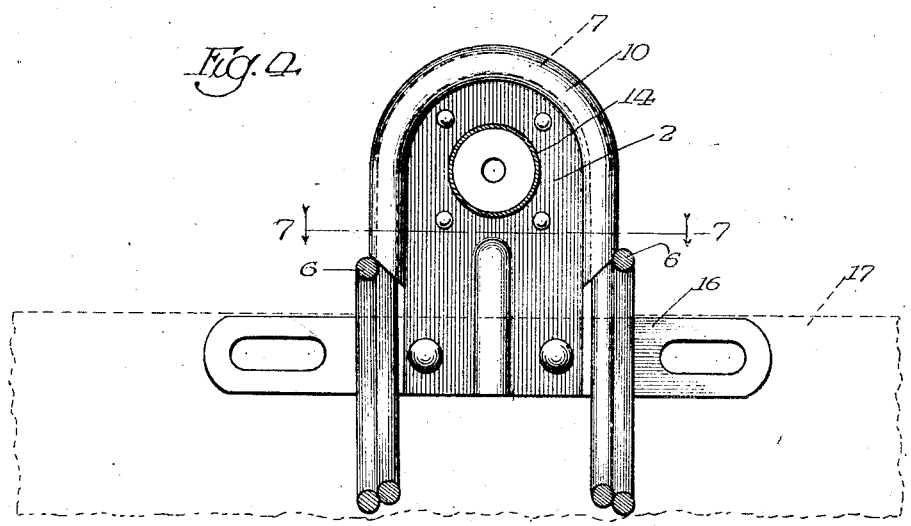
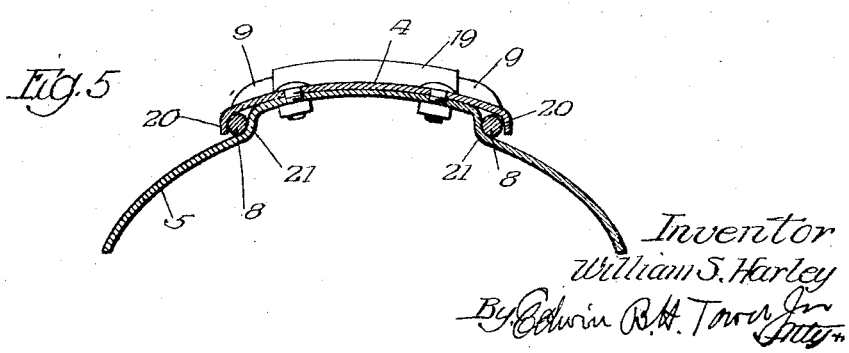
Inventor
William S. Harley
By Edwin R. H. Tower Jr. Atty.

Sept. 15, 1925.
W. S. HARLEY
1,553,610
LAMP BRACKET
Filed April 13, 1922   3 Sheets-Sheet 3
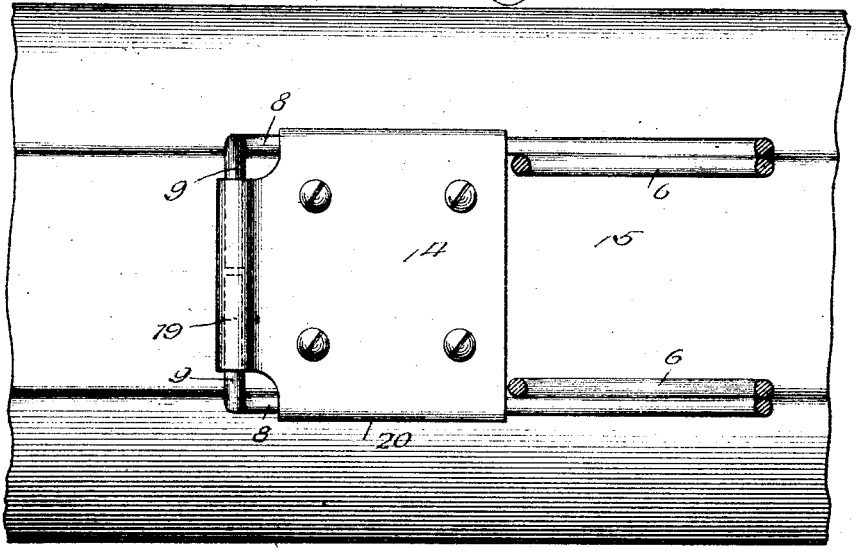
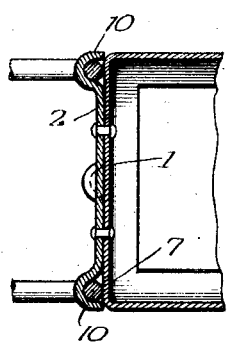
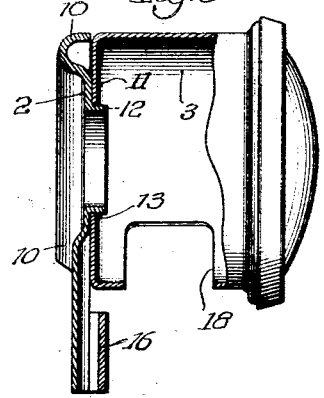
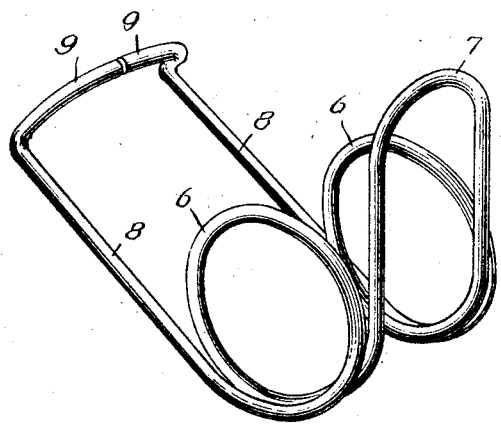
Inventor
William S Harley
By Edwin B H Tower Jr
Atty Patented Sept. 15, 1925.

1,553,610

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

LAMP BRACKET.

Application filed April 13, 1922. Serial No. 552,409.

*To all whom it may concern:*

Be it known that I, WILLIAM S. HARLEY, a citizen of the United States, residing at Milwaukee, in the county of Milwaukee and State of Wisconsin, have invented new and useful Improvements in Lamp Brackets, of which the following is a specification.

This invention relates to a lamp bracket.

The electric lamps employed on self propelled vehicles, such as motorcycles and automobiles, are ordinarily rigidly fastened thereto and subjected to shocks resulting from passage of the vehicle over rough roads and uneven pavements and to vibrations of the engine.

Such shocks and vibrations cause breakage of the lamp bulb filament.

An object of this invention, therefore, is to so support a lamp bulb on a vehicle that breakage of the filament thereof due to shocks and vibrations of the vehicle is greatly reduced, if not entirely eliminated.

Another object is to provide cushioning means between a vehicle and the bulb of an electric lamp mounted thereon.

Another object is to provide a resilient supporting bracket for attaching an electric lamp to a vehicle.

Another object is to provide a simple durable resilient lamp bracket which may be economically manufactured and readily applied to the lamp and the vehicle.

Other objects and advantages will hereinafter appear.

The invention will be described as applied to a tail lamp of a motorcycle, although it will be understood that it may be applied to other lamps employed on automobiles, bicycles and other vehicles.

The views of the drawings are:

Fig. 1 is a side elevation of the rear wheel of a motorcycle and its mudguard on which a tail lamp is supported by the bracket.

Fig. 2 is a rear elevation of the lamp attached to a motorcycle rear wheel mudguard.

Fig. 3 is an enlarged vertical section on line 3—3 of Fig. 2.

Fig. 4 is a vertical section on line 4—4 of Fig. 3.

Fig. 5 is a section on line 5—5 of Fig. 3.

Fig. 6 is an enlarged plan of the clamping plate for fastening the bracket to the mudguard.

Fig. 7 is a horizontal section on line 7—7 of Fig. 4.

Fig. 8 is a vertical section through the lamp casing and clamping plate.

Fig. 9 is a perspective of the resilient lamp bracket.

The bracket comprises a resilient member 1, a clamping plate 2 for fastening one end thereof to the lamp casing 3, and a clamping plate 4 for fastening the other end of the resilient member 1 to the rear mudguard 5 of a motorcycle.

The resilient member 1 is formed from a single spring wire into two spaced parallel coils 6, the middle of the wire between the coils being formed into an inverted U shaped arm 7 for attachment to the lamp.

The free ends or arms 8 extend from the coils in parallel relation to each other and at an angle to the arm 7, and the extremities 9 thereof are bent toward each other to form a curved anchor which co-operates with the clamping plate 4 to lock the bracket 1 on the mudguard.

The clamping plate 2 has a grooved flange 10 for receiving the inverted U shaped bracket arms 7.

The clamping plate 2 is riveted or otherwise rigidly fastened to the rear wall 11 of the lamp casing and clamps the bracket arm 7 against the same. The grooved flange 10 prevents any movement of the bracket.

The clamping plate 2 has an internally threaded flanged opening 12 which extends through an opening 13 in the rear wall 11 and into the lamp casing. The flange assists in positioning and fastening the clamping plate on the lamp casing.

The clamping plate 2 supports an externally threaded tubular socket 14 extending through the opening therein and into the lamp casing 3. The socket 14 is screwed into the threaded flange 12 and may be soldered thereto to prevent the socket from working loose.

The socket 14 contains the usual terminals and contacts and the forward end thereof is arranged to receive the base of an electric lamp bulb 15. The lamp bulb 15 is locked in the socket 14 by the usual bayonet joint or other suitable means.

To the lower end of clamping plate 2 is fastened a transversely extending perforated bracket 16 to which a license plate 17 may be attached.

The usual transparent window 18 through which light from the lamp bulb 15 shines on the license plate 17 may cover an opening in the bottom of the lamp casing.

The clamping plate 4 screwed or otherwise fastened to the rear mudguard 5 rigidly clamps or fastens the resilient lamp bracket thereto.

One end of the clamping plate 4 has a grooved flange 19 for receiving the curved extremities 9 of the lamp bracket 1, whereby the bracket is anchored to the mudguard.

The clamping plate 4 is also provided with flanges 20 which co-operate with grooves 21 in the mudguard 5 to hold the arms 8 of the bracket in place.

When an electric lamp and particularly the tail lamp is mounted on a motorcycle by means of a rigid bracket, considerable trouble is experienced due to breakage of the lamp bulb filaments. This breakage is due both to the shocks resulting from movement of the motorcycle over rough roads or uneven pavements and to the vibrations of the engine.

It has been found that if cushioning means are provided between the lamp bulb and the motorcycle, this breakage of lamp bulb filaments is very greatly reduced, if not eliminated entirely.

However, it has been found that it is not necessary to insulate the lamp bulb from every road shock and engine vibration, but only against the sudden shocks and vibrations.

If an attempt be made to insulate the lamp bulb against the gradual, as well as the sudden, shocks and vibrations, the resiliency of the cushioning means then becomes so great that the lamp is continually moving up and down while the motorcycle is running, which is undesirable.

Therefore, the resiliency of the bracket 1 should be such as will allow movement of the lamp in response to gradual up and down movements of the motorcycle while eliminating sudden movements of the lamp in response to sudden movements of the motorcycle.

While cushioning of the lamp bulb only reduces the filament breakage, this breakage is still further reduced by placing the cushioning means between the entire lamp and the motorcycle as the inertia of the lamp assists the spring bracket in preventing sudden movements of the lamp.

The invention contained herein is, of course, susceptible of other embodiments and adaptations.

The invention claimed is:

1. In combination, an electric lamp having a casing provided with an opening in a wall thereof, a resilient bracket for attaching the lamp to a vehicle, a clamping plate for clamping one end of the bracket against the casing, said plate having a flanged opening for registering with the wall opening, and a tubular lamp bulb socket extending through the registering openings and into the casing.

2. A resilient lamp bracket comprising a wire formed into two resilient coils spaced apart by a U-shaped attaching arm formed of the portion of the wire between the coils and lying in a plane at an angle to the planes of the coils, the free ends of the wire extending from the coils in substantially the respective planes thereof and at an angle to the plane of the U-shaped attaching arm and a clamping plate having a grooved flange on one end, and side flanges for receiving the free ends of the lamp bracket to secure the same to the vehicle.

3. In combination, a vehicle mud guard having a grooved surface, a resilient bracket supported thereon comprising a spring wire formed into two spaced coils having rearwardly extending free ends, and a clamping plate having side flanges cooperating with the grooved surface of the mud guard to engage the free ends of the bracket and rigidly secure the same thereto.

4. In combination, an electric lamp having a casing provided with an opening in a wall thereof, a supporting bracket therefor, a clamping plate for securing the lamp to said bracket, said plate having a flange extending through the opening in the casing to assist in positioning the lamp on said plate.

5. In combination, an electric lamp having a casing provided with an opening in the wall thereof, a resilient bracket for attaching the lamp to a vehicle, a clamping plate for clamping one end of the bracket against the casing, said plate having a flanged opening for registering with the wall opening, said flange extending through the opening in the casing to assist in positioning a lamp bulb socket in said plate, and a tubular lamp bulb socket extending through the register openings into the casing.

6. A bracket comprising a vertical spring arm, a second arm at an angle thereto, an integral coil within the angle formed by the arms, the second arm being formed by two parallel spring wires brought together at their ends and forming a substantially vertical arch, a clamping plate for said second arm having parallel longitudinal grooves, and a vertical arched groove for the ends of said second arm.

7. In combination, a lamp casing provided with an opening in the rear wall thereof, a resilient bracket for holding said casing in position relative to a vehicle, and a plate secured to said rear wall, said plate being provided with an opening to register with the wall opening and to receive a lamp socket, one end of said bracket being clamped against said casing by said plate.

In witness whereof, I have hereunto subscribed my name.

WILLIAM S. HARLEY.